United States Patent [19]

Ryder et al.

[11] Patent Number: 4,871,200
[45] Date of Patent: Oct. 3, 1989

[54] FIXTURE FOR TYING FISHING KNOTS

[75] Inventors: Francis E. Ryder; Fred E. Williams, Jr., both of Arab, Ala.

[73] Assignee: Ryder International Corporation, Arab, Ala.

[21] Appl. No.: 208,386

[22] Filed: Jun. 17, 1988

[51] Int. Cl.$^4$ .............................................. D03J 3/00
[52] U.S. Cl. ...................................................... 289/17
[58] Field of Search ........................................... 289/17

[56] References Cited

U.S. PATENT DOCUMENTS

| | | | |
|---|---|---|---|
| 2,773,713 | 12/1956 | Smalley | 289/17 |
| 4,336,960 | 6/1982 | Seki | 289/17 |
| 4,417,756 | 11/1983 | Herke | 289/17 |
| 4,573,719 | 3/1986 | Aldridge | 289/17 |

FOREIGN PATENT DOCUMENTS

1564599  4/1980  United Kingdom ................. 289/17

Primary Examiner—Werner H. Schroeder
Assistant Examiner—Douglas E. Price
Attorney, Agent, or Firm—R. A. Giangiorgi

[57] ABSTRACT

A fixture for facilitating the tying of a given knot in a fishing line comprises a platform member providing a flat surface for mounting a plurality of assemblies. These assemblies include a spool assembly having a spool for respectively taking up or letting out line, a spool crank for rotating the spool in at least one direction, a spool frame for mounting the spool for rotation about a first axis of rotation, and a spool frame base for mounting the spool frame to the platform. A spinner assembly comprises a spinner base mounted to the platform and a spinner bidirectionally freely rotatably mounted to the spinner base for rotation about a second axis of rotation. The spool base and the spinner base are mounted in side-by-side relationship and spaced apart on the platform in such a manner as to align the first and second axes of rotation substantially at right angles to each other and the spool assembly and the spinner assembly are mounted to the platform and arranged thereupon in such a manner as to facilitate the tying of a given knot in a fishing line.

24 Claims, 9 Drawing Sheets

FIXTURE FOR TYING FISHING KNOTS

BACKGROUND OF THE INVENTION

This invention is directed generally to a device for facilitating the tying of certain fishermans knots, and more particularly to a fixture for facilitating the tying of a knot used in fishing, and known as the "bimini twist" and/or a knot known as the "off shore swivel".

Heretofore, two relatively complex knots used in fishing and known respectively as a bimini knot or bimini twist and an offshore swivel knot have been tied entirely by hand. The bimini twist knot in particular requires great agility and skill, commonly requiring the fisherman to use both hands as well as one or both feet during the tying thereof. Often, two fisherman are required to properly hold and secure the line while tying the bimini twist knot. Generally speaking, the bimini twist is tied in a line in order to form a double line with a loop that becomes stronger than the standing part of the single line, while maintaining the fuel line strength in the knot itself.

Practically speaking, the bimini twist is considered one of the most important knots utilized in fishing as it is used for the tag end of virtually any braided or monofilament line in order to obtain a double line. It is considered the primary knot for making a double line on offshore trolling reels. It can also be used to fashion a shock leader for casting, for making fly leaders, or for any of a variety of assignments which require a highly efficient, strong and reliable knot.

Similarly, the offshore swivel knot, while designed originally to attach a swivel securely to the double line used in offshore big-game trolling, can also be used for attaching a hook or other lure to a double line. It may also be used when fishing natural bait in shallow waters for such species as bonefish. Its main advantage is that if one strand of a doubled line breaks, the other strand will not slip when using the offshore swivel knot.

While the bimini twist knot may be utilized separately, it is considered appropriate practice before tying an offshore swivel knot to place the bimini twist knot in the double line first.

OBJECTS AND SUMMARY OF THE INVENTION

Advantageously, we have provided a novel fixture for greatly facilitating and simplifying the tying of both the bimini twist and offshore swivel knots.

Briefly and in accordance with the foregoing, the invention provides a fixture for facilitating the tying of a given knot in a fishing line, said fixture comprising: a platform member providing a flat surface for mounting of a plurality of assemblies, said plurality of assemblies comprising a spool assembly including spool means for respectively taking up or letting out line, spool crank means for rotating said spool means in at least one direction, spool frame means for mounting said spool means for rotation about a first axis of rotation defined by the spool means, and spool frame base means for mounting said spool frame means to said platform; a spinner assembly comprising spinner base means mounted to said platform and spinner means bidirectionally freely rotatably mounted to said spinner base means for rotation about a second axis of rotation; said spool base means and said spinner base means being mounted in side-by-side relationship and spaced apart on said platform in such a manner as to align the first and second axes of rotation substantially at right angles to each other and wherein said spool assembly and said spinner assembly are mounted to said platform and arranged thereupon in such a manner as to facilitate the tying of said given knot in a fishing line.

DETAILED DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Figure 1:
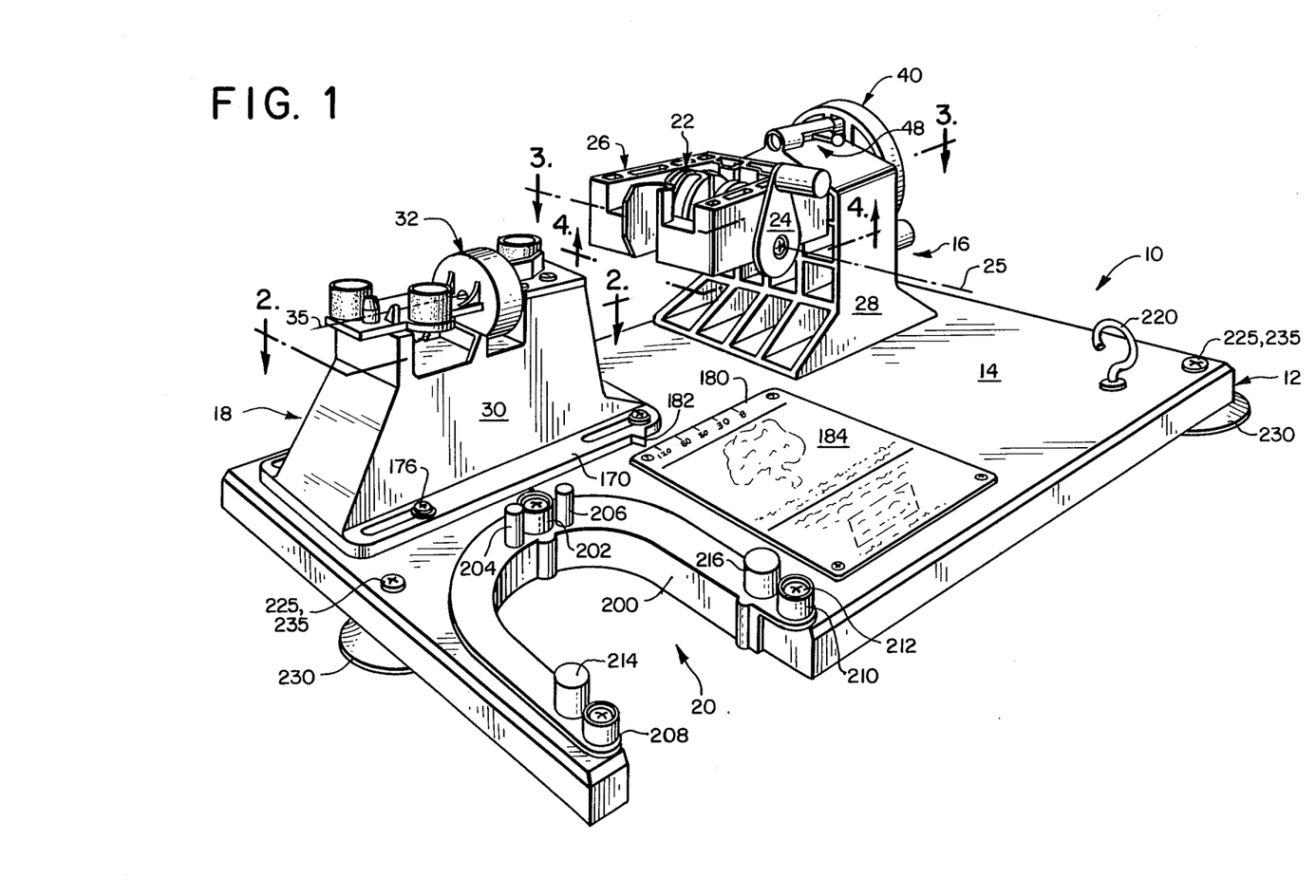
FIG. 1 is a perspective view of a fixture in accordance with the invention.

Referring now to the drawings and initially to FIG. 1, a fixture for facilitating the tying of one or more fishing knots in a fishing line is illustrated in perspective and designated generally by reference numeral 10. Generally speaking, the fixture 10 includes a broad, relatively flat base or platform member or portion 12 which provides a broad flat surface 14 for mounting a plurality of assemblies which make up the fixture in accordance with the invention.

These assemblies include a first or spool assembly designated generally by the reference numeral 16 and spinner assembly designated generally by reference numeral 18. In accordance with the preferred form of the invention illustrated, and as will be more fully described hereinbelow, the spool assembly 16 and spinner assembly 18 are mounted to the base 12 and are configured and arranged thereupon to specifically facilitate the tying of a fishing knot known as the bimini twist or bimini knot.

In accordance with the preferred form of the invention illustrated herein, the fixture 10 also includes a further "U-frame" assembly designated generally by reference numeral 20 which is specially adapted and configured for the tying of a second fishing knot generally known as the offshore swivel knot.

Referring initially to the spool assembly 16, further details thereof are also shown in FIGS. 3, 4, 6 and 7, and reference is therefore also invited to these additional figures in connection with the ensuing description. The spool assembly 16 includes a spool or spool means 22 which is bidirectionally rotatable for respectively taking up or letting out line during the tying of the knot. Spool crank means 24 is provided for rotating the spool means 22 in at least one of its two directions of rotation. In this regard, the spool means 22 and spool crank means 24 are mounted to a spool frame member or means 26 so that the two may be rotated relative to a first axis of rotation 25 which is generally defined by the spool means 22 (see FIG. 6). The spool frame means 26 is in turn mounted (for bidirectional rotation, as will be more fully described hereinbelow) to a spool frame base member or means 28 which is in turn mounted to the surface 14 of platform 12.

In similar fashion, the spinner assembly includes a spinner base member or means 30 which is mounted to the surface 14 of the platform 12. This spinner base means 30 in turn mounts a spinner means 32 for bidirectional rotation about a second axis 35 (see FIG. 5). As best viewed in FIG. 1, and as will also be appreciated later upon description of the tying of a bimini twist knot with reference to FIGS. 8 through 15, spool base means 28 and spinner base means 30 are mounted in generally side-by-side relationship spaced apart on the platform 12. This spacing, as well as the relative orientation of the two base means or members 28, 30 is such as to align the first and second axes of rotation 25, 35 substantially at right angles to each other. This arrangement is such as to facilitate the tying of a bimini twist knot in a fishing line.

Figure 3:
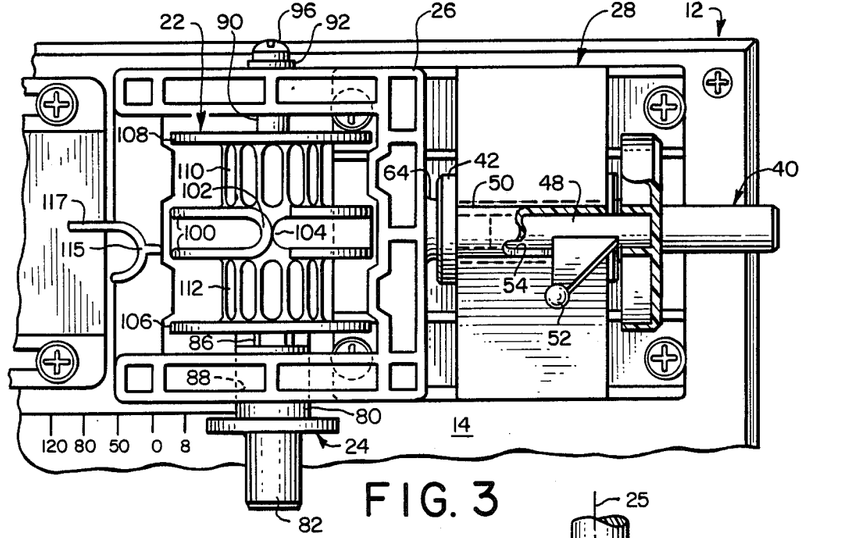
FIG. 3 is an enlarged sectional view, partially broken away to show details, and taken generally along the line 3—3 of FIG. 1.
Figure 4:
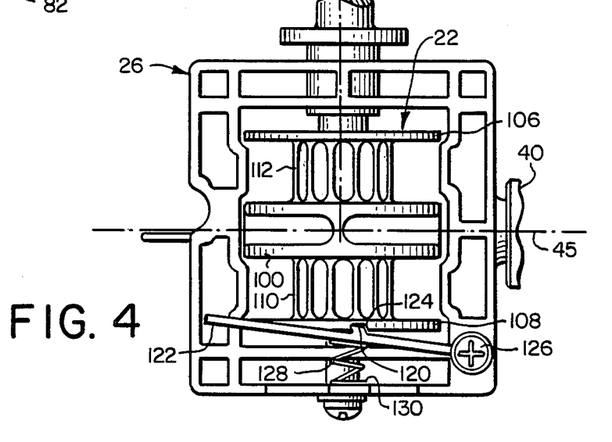
FIG. 4 is an enlarged partial plan view taken generally along the line 4—4 of FIG. 1.
Figures 6, 6A:
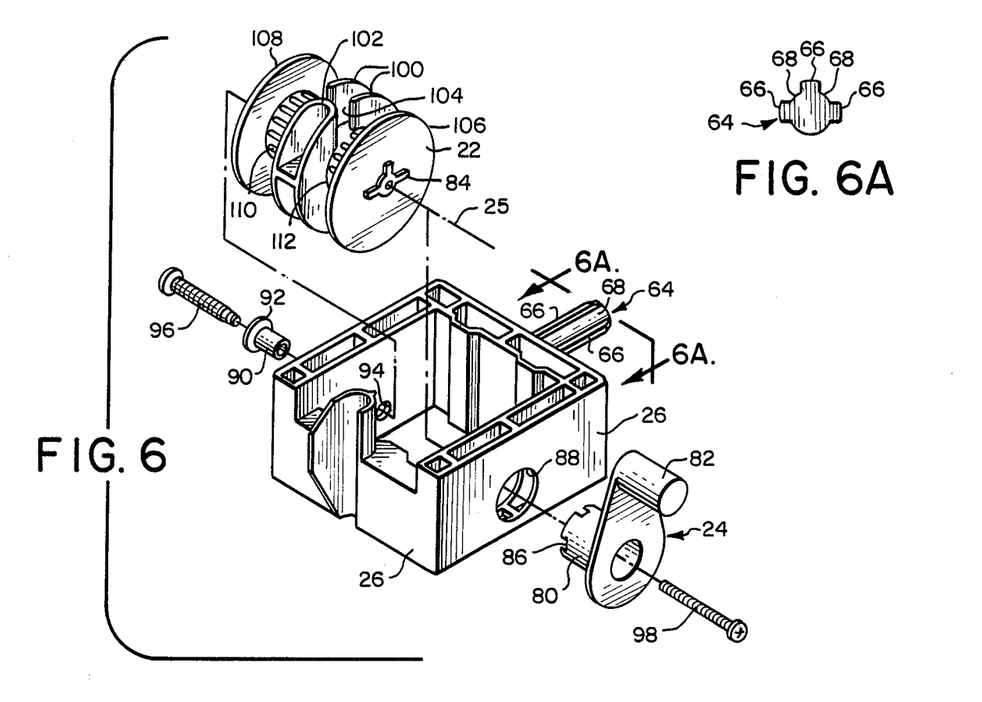
FIG. 6 is an exploded perspective view showing further details of a spool and spool frame portion of the assembly of FIG. 1.
FIG. 6A is a view along section 6A—6A in FIG. 6.
Figures 7, 7A:
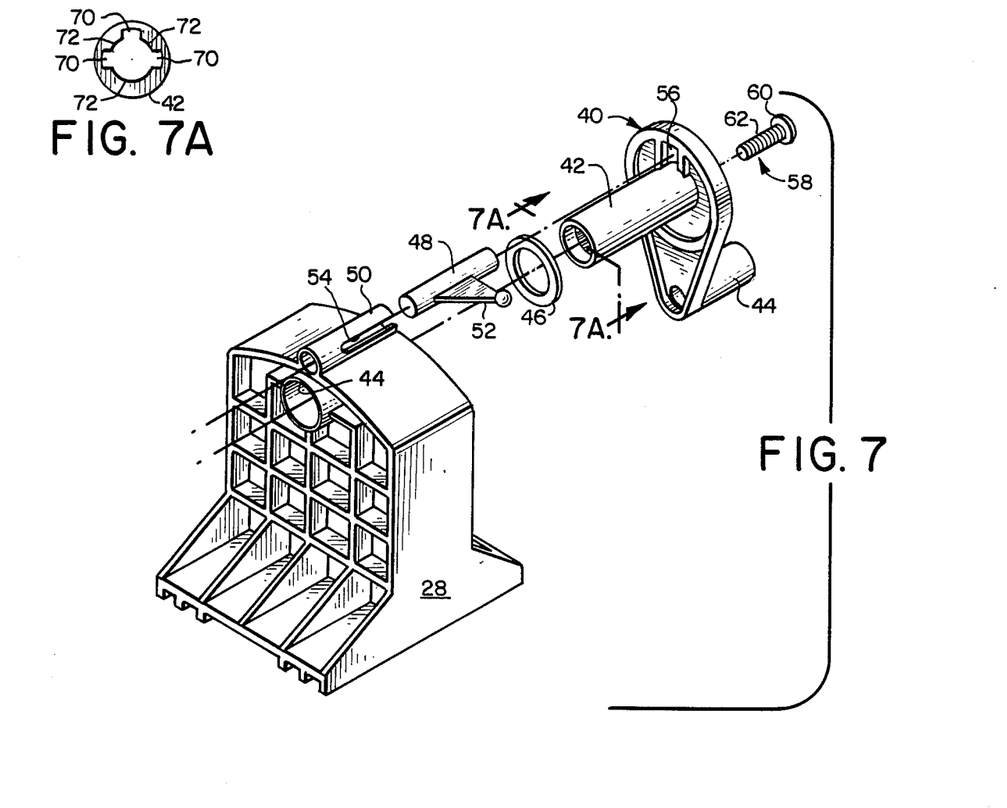
FIG. 7 is an exploded perspective view showing further details of an end crank and spool frame base portion of the assembly of FIG. 1.
FIG. 7A is a view along section section 7A—7A in FIG. 7.

Reference is now invited to FIGS. 3 and 4, and to FIGS. 6 and 7, wherein further details of the spool assembly are illustrated.

Turning first to FIG. 7, a further, end crank means or member 40 is rotatably journaled in the spool frame base mean or member 28 for bidirectional rotation. This end crank 40 is further coupled with the spool frame means or member 26 (see FIG. 4) for rotating the same about an axis 45 which is substantially perpendicular to the axis of rotation 25 of the spool means or member 22.

In the illustrated embodiment, the rotatable journaling of crank 40 is accomplished by the provision of an elongate, coaxially projecting sleeve or bushing portion 42 which is integrally formed with crank 40, and from which an oppositely projecting crank handle 44 extends in a radial direction. The bushing or sleeve 42 is coaxially engaged by a through cylindrical open-ended bore portion 44 formed in the base means or member 28. An additional friction bearing ring 46, preferably of an elastomeric material, is further interposed between facing surfaces of the crank 40 and base 28 to enhance free rotation therebetween.

In accordance with a further and preferred feature of the invention, a locking pin or pin means 48 is also provided, and in the illustrated embodiment is slideably mounted within a generally cylindrical sleeve 50 formed in the base member or means 28. The locking pin 48 has an outwardly projecting grasping portion or handle 52 for bidirectionally sliding the same relative to the sleeve 50, which is provided with an elongate slot 54 for accommodating handle 52. The end crank means or member 40 is provided with a pair of spaced apart generally axially projecting rib members or means 56 which are arranged for surroundingly engaging the pin 48 when it is positioned projecting outwardly of its sleeve 50. Accordingly, it will be seen that the arrangement of the locking pin and ribs 56 of the crank are such as to hold the crank fixed in a predetermined position (handle 44 "down" as in FIG. 1) when the pin is engaged with the crank.

The crank member 40 is in turn secured to the frame 22 by means of a threaded fastener 58 which projects through an end opening in the crank 40 and has an enlarged head 60 which seats against an outer surface thereof. A threaded shank portion 62 of the fastener 58 extends into and threadably engages an internally threaded projecting boss 64 on the frame member 22. Preferably the projecting boss 64 extends coaxially within the sleeve 42 of the crank 40 to receive the threaded fastener 58 and thereby hold the two (i.e., crank 40 and frame 42) in close engagement for rotation in unison.

To further assure the rotation in unison of crank 40 and frame 22, the sleeve 42 and boss 64 are further provided with mating, interlocking, axially extending and radially projecting alternate ridges and channels or lands and grooves, 66, 68 and 70, 72 described in detail in FIGS. 6A and 7A, respectively. Preferably, however, these mating ridges and grooves are formed in a non-symmetrical fashion, such that the crank 40 may be assembled with the frame 22 in but a single orientation, that is, with the crank handle 44 in the "down" position as illustrated in FIG. 1, when the frame is oriented for holding the spool in its "face up" position, as will be more fully described later, as is also illustrated in FIG. 1 (see also FIGS. 6 and 7).

Referring now to FIG. 6, the spool member 22 is mounted to the spool frame 26 to be rotated by crank 24 in a similar fashion to that noted above with respect to the mounting of frame 26 to crank 40. That is, crank 24 has a projecting sleeve 80 which is formed for coaxially engaging the spool 22 with respect to axis 25. A crank handle 82 projects radially from and axially opposite sleeve 80. The sleeve 80 and a facing surface of spool 22 are also formed with non-symmetrical and interengageable raised ridges and recesses or grooves 84, 86, respectively for holding the two engaged for rotation together in a predetermined orientation. This predetermined orientation is with the crank handle 82 generally in the "up" position as illustrated in FIG. 1, for example when the spool 22 is also in its face up position as illustrated in FIG. 1. Sleeve 80 is rotatably journaled in a concentrically formed through bore 88 in one side of the frame 26.

An opposite end of the spool 22 is rotatably engaged by friction bearing member 90 which takes the form of a cylindrical sleeve having an enlarged head 92 and is in turn engaged with a through bore 94 in an opposite side of the frame 26. Respective threaded fasteners 96, 98 project through the handle 24 and sleeve 90, respectively to engage pretapped bores in the body of the spool 22. Accordingly, the spool 22 rotates essentially about the bearing surfaces provided by the two sleeves 80 and 90, respectively, relative to the frame 26.

In order to accommodate a doubled-over or looped line, as will be more fully explained hereinbelow, the spool 22 is provided with upstanding ridge means 100, which essentially includes a pair of parallel and spaced apart ridges extending concentrically around the spool about a major portion thereof. These ridges 100 come together to form a nose or hook-like projection 102 with a rounded end, which is spaced apart by a slight angular distance from the leading or starting edges of ridges 100 to form a slot 104 for accommodating the end of a loop or bent-over length of fishing line.

These ridges 100, together with generally cylindrical disc-like end walls 106, 108 of the spool 22 also define a pair of parallel and spaced apart channels 110, 112 for respectively reeling up and unreeling lengths of line to either side of the bent-over or looped-over portion thereof. This in effect enables the creation of a double line of any desired length, depending upon the amount of line which is reeled up on the reel in the respective channels 110, 112. Preferably, the frame 26 also includes a generally centrally located U-shaped guide member or projection 115 which is generally aligned with the ridges 100. This guide member 115 therefore forms a generally U-shaped recess and also has a forwardly extending wall portion or blade 117. This blade and the recess provide a space for tying portions of the knot as will be more fully explained hereinbelow.

Referring now also to FIG. 4, a ratchet arrangement is also preferably provided for the spool 22. In the embodiment illustrated, this ratchet arrangement takes the form of a ratchet means or axially outwardly extending ramped ratchet tooth and corresponding depression, as indicated generally at reference numeral 120, on sidewall 108 of the spool 22. The ratcheting action is achieved by the provision of a complementary ratchet engaging means mounted to the spool frame means 26. This ratchet engaging means takes the form of an elongate, spring-loaded, manually releasable lever 122 which has a complementary ratchet tooth or stop surface 124 for engagement with the ratchet tooth 120. The lever is mounted at a fulcrum pivot point 126 and is spring loaded into engagement with the side wall 108 by a compression spring 128 which bears against respective facing surfaces at a mid-point of lever 122 and along an outer side wall portion 130 of the frame member or means 26.

Accordingly, this ratchet arrangement normally permits movement in but a single direction, and preferably in the direction for winding up the line on the spool 22 in response to winding of the crank 24. However, the spool may be readily released for unreeling line by manually depressing the lever 122 to allow free rotation of the spool. It will be noted that the ratcheting arrangement also assures that a given amount of line will remain securely reeled up on the spool at any given time, without the need for hand tensioning of the same by constant manual pressure on the crank, for example. Moreover, the positioning or orientation of ratchet tooth 120 on the spool is generally 180 degrees opposite the location of the nose 102 and notch 104 defined thereby, such that the spool will ratchet into a locked rest position with the crank handle 82 in the "up" position as illustrated in FIG. 1.

Figure 2:
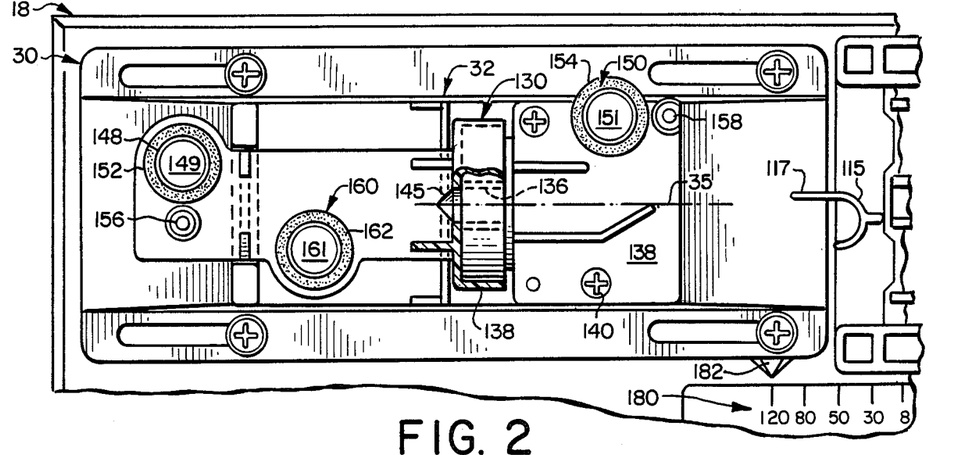
FIG. 2 is an enlarged, partial sectional view, partially broken away to show details, and taken generally along the line 2—2 of FIG. 1.
Figure 5:
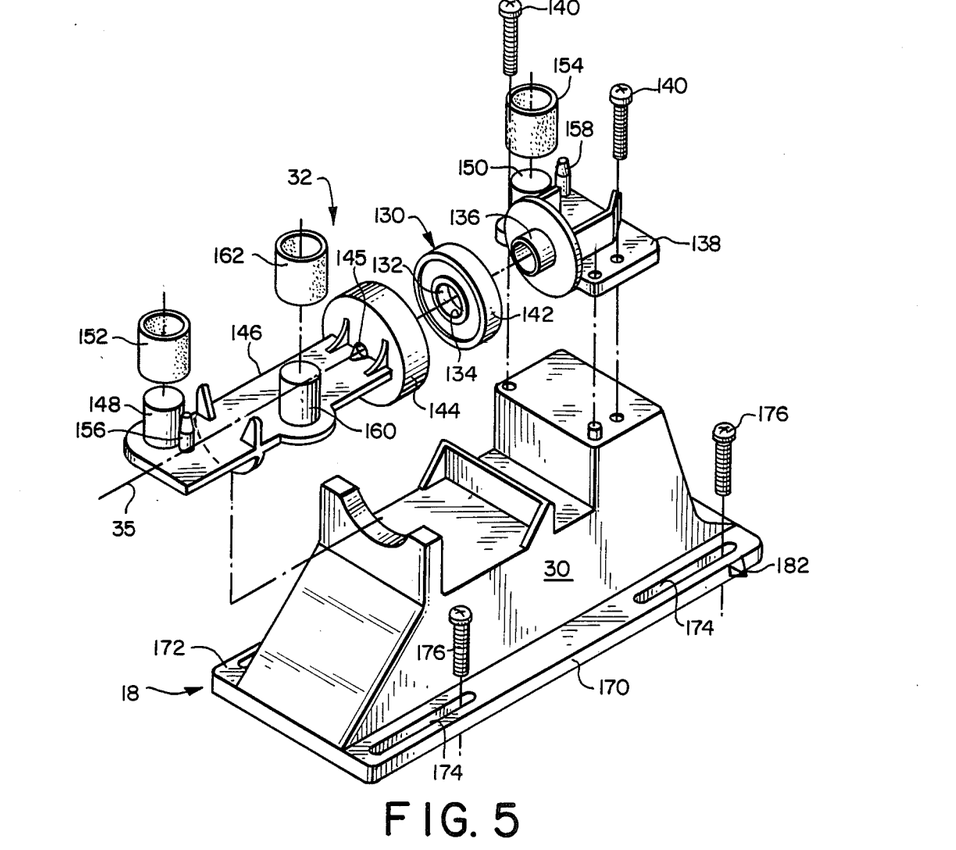
FIG. 5 is an exploded perspective view showing a spinner assembly portion of the fixture of FIG. 1.

Turning next to FIGS. 2 and 5, the spinner assembly will now be described in further detail. The spinner means 32 comprises a generally cylindrical bearing member 130 which has a through central opening 132. In the illustrated embodiment, the bearing 130 is a generally annular ball bearing assembly, however, other bearing types may be utilized without the parting from the invention.

The bearing 130 has an inner race 134 which is press fitted on a projecting sleeve 136 on a first mounting or frame member 138. This frame member 138 is in turn rigidly secured to the base 30, for example by use of threaded fasteners 140. The bearing 130 also has an outer race 142 which is a press fit within an opposite projecting sleeve 144 of a second frame-like member 146. A coaxially aligned through opening 145 is also provided in the sleeve 144. The frame member 146 projects freely outwardly of the rigidly mounted frame member 138 to thereby rotate freely about the latter, generally about the axis of rotation 35, which is also the central axis of the bearing 130. This frame 146 is generally therefore cantilevered over the base 30.

In order to provide a number of places for securing line relative to the spinner assembly 32, a plurality of projecting, line-securing post means or members are also provided. Preferably at least one such line securing post 148, 150 is provided to either side of the bearing 130 along axis 35, and preferably one such securing post or means is provided on each of the frame members 146 and 138. In the illustrated embodiment a further such line securing post or projection 160 is also provided on frame 146. The first two projections or post 148, 150, each includes a projecting generally cylindrical boss or embossment 149, 151 which are preferably integrally formed with the respective base members 138 and 146. Each of these bosses is further provided with a sleeve 152, 154 preferably of an elastomeric material.

In order to grippingly engage or clamp a line with respect to each of these sleeves 152, 154, a pair of second projecting embossments 156, 158, preferably having a frustroconical outer ends are also provided fairly closely spaced to the respective elastomeric sleeves, such that line may be guided over the frustroconical head portion and into a clamping engagement therebetween.

The projecting post member 160 also includes a cylindrical embossment 161 preferably formed integrally with the material of frame member 146 and a similar elastomeric sleeve 162 engaged over the boss 161. This latter post may be used for looping or tying a line as necessary or desirable.

Finally, the entire spinner assembly is movable generally along axis 35 for adjusting the spacing between the spinner assembly and the spool assembly on the platform 12. This in turn adjusts for the thickness or gauge of line in which the knot is to be tied and also adjusts the length of the knot. This axial movement is accommodated by the provision of a pair of outwardly projecting shoulders 170, 172 on the base 30, each of which is provided with a pair of coaxially aligned elongate slots 174. These slots in turn receive threaded fasteners 176 for securing the same to the surface 14 of the platform 12. Hence, a slight loosening of respective fasteners 176 will permit slidable movement and repositioning of the base 30 and hence of the spinner assembly as a whole, relative to the platform and relative to the spool assembly whose base 28 remains rigidly coupled to platform 12. In order to adjust for the gauge of line being used, a scale 180 is also provided on the surface 14 of the base 12. This scale 180 includes respective markings indicating the correct positioning of the base 30 for different gauges of line. A corresponding pointer or indicator 182 is formed as a projection from shoulder 170 of the base 30. Preferably the scale 180 is provided as part of a name plate 184.

Turning now briefly to the second fixture 20, this fixture includes a generally U-shaped or "U-frame" member 200 which includes a series of projecting, line-engaging post means or members. The first of these post means or members 202 takes the form of a cylindrical upwardly projecting post member having a slightly longer and smaller diameter cylindrical post member 204, 206 spaced slightly to either side thereof. Post 202 generally forms or defines the center of the U-frame 200. Adjacent respective free outer ends of the U-frame 200 are two further projecting posts 208, 210 which are substantially identical in form to post 202. In this regard, each of the posts 202, 208, 210 preferably also receives an elongate threaded fastener 212 therethrough for securing the U-frame assembly to the surface 14 of the platform 12.

Each of the latter posts 208, 210 is also provided with a further post 214, 216 which is somewhat taller but of similar diameter thereto, and is spaced apart somewhat therefrom. These latter posts 214, 216 are preferably about the same height as post 204, 206. Finally, a hook 220 is also provided on platform 212 in the open area thereof generally opposite the U-frame assembly 200. The platform 212 may also be provided with means for mounting the same to a stationary surface, if desired. These mounting means may take the form of a plurality of elongate threaded fasteners 225, or alternatively a plurality of suction cup mounting feet 230, as desired.

Having described the basic structure of the invention, the description will proceed by illustrating the tying of the bimini twist and offshore swivel knots using the fixture according to the invention.

Referring initially to FIG. 1, the fixture may be permanently mounted to any convenient surface with three screws 225, as mentioned above. However, it is designed to be portable when used with the three suction feet 230, which may be assembled to the base by the use of machine screws 235. First, adjust the fixture for the line weight of the line selected by loosening the four screws 176, setting the pointer 180 to line weight desired (on scale 182), and then retightening screws 176. This also sets the length of the knot.

Now we are ready to get started tying a knot. We will do it in four phases and at the end of each phase you can let go of the line and take a hands-off break if you wish. A great convenience if you are tying a knot on the boat while fishing and get interrupted by other chores.

Figure 8:
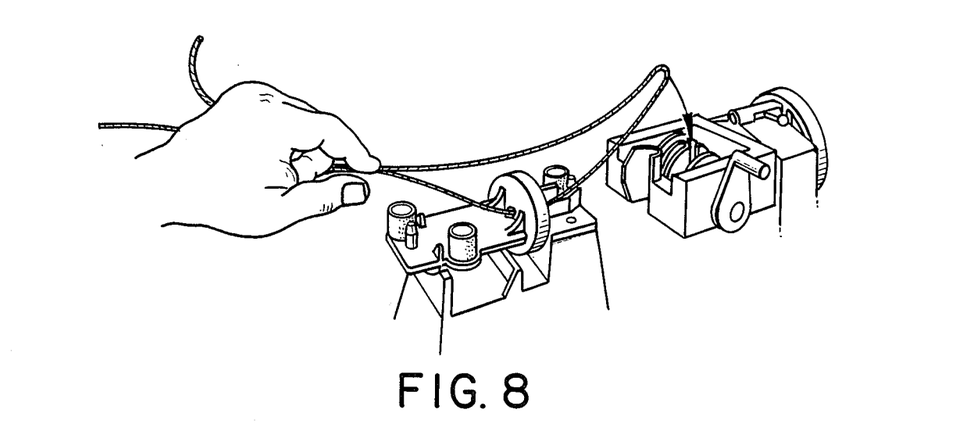
FIGS. 8 through 21 inclusive, are a series of views illustrating the tying of a bimini twist knot and thereafter, the tying of an offshore swivel knot, utilizing the fixture of FIG. 1, in accordance with the invention.

Refer now to FIG. 8. Turn the end crank handle 44 down and slide the locking pin 48 into the locking aperture 56 in the end crank 40. Turn the spool crank 24 clockwise until the handle 82 is in the up position. You should feel and hear the ratchet click as you pass over the top. Set your rod in a holder with the rod tip at least four feet to the left of the fixture. Apply just enough reel drag to spool without backlash when you pull line from the tip. Insert the tag end of your line into the spinner hole and pull as much line through as the length of double line desired, plus an extra 18" to be used for tying the knot. As an example, if you want a 15 foot loop, pull through 15 feet plus 18" for a total of 16 feet 6 inches. Since the base is one foot wide, it can be used to measure length. Just be careful not to violate IGFA Rules by making your loop too long.

Figures 9, 10:
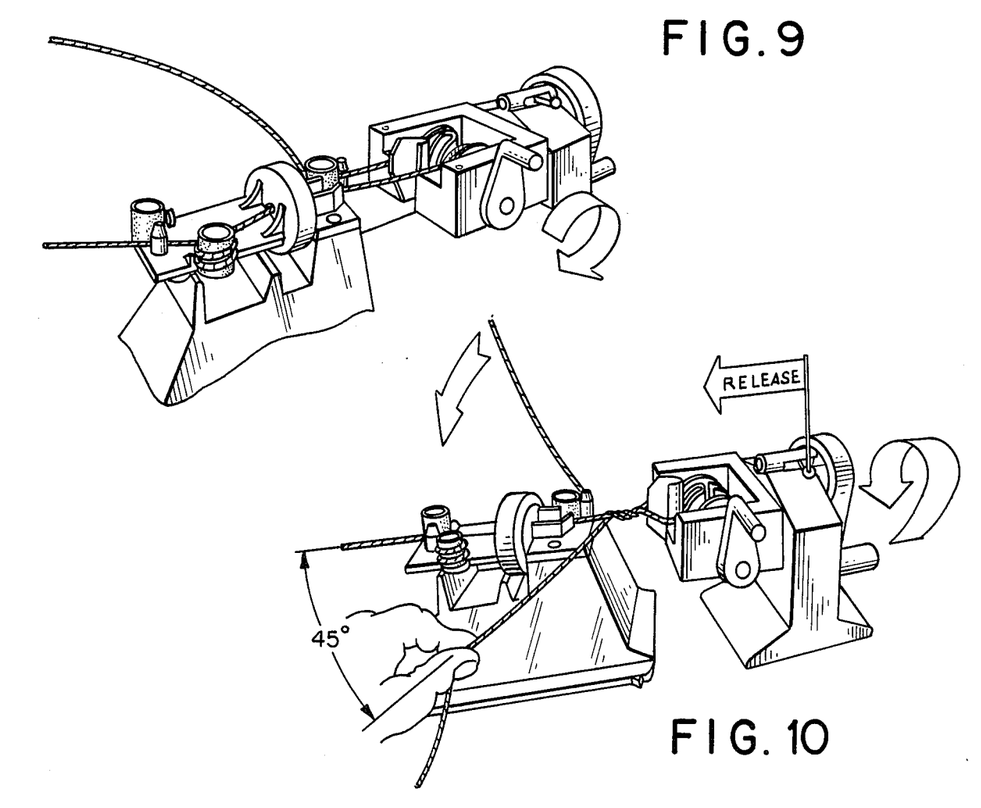

After pulling the measured length of line through the spinner hole 132, 145, fold it back alongside the standing line. This will create a loop. Hook the looped line in the spool slot 104. Apply drag to both lines with you left hand and turn the spool crank 24 clockwise with your right hand, winding the line tightly on to the spool until about 18" of tag end is left hanging over. Note that when you do this, it pulls additional line from your reel as needed to complete the double loop. Refer now to FIG. 9. Hold both lines tight to prevent backlash on the spool and push the tag end down into tag clamp 150. The tag end line is pinched between the pointed post 158 and the rubber bushing 154. Grab the standing line to the left of the spinner and pull it tight while wrapping it counter clockwise around the capstan 160 at least two complete wraps. Push the standing end of the line down into standing clamp 148 where it is pinched between the pointed post 156 and the rubber bushing 152. Your hands are now free to take a break if you wish, before proceeding.

Refer now to FIG. 10. Grab the tag end with your left hand and release it from the tag clamp. Pull tag end towards you and position it at about a 45 angle to the left. Release the locking pin 48 that locks the end crank. Keep slight tension on the tag end. Turn the end crank clockwise so it will twist the tag end and standing end together. Continue until an even haywire twist is completely formed.

Figure 11:
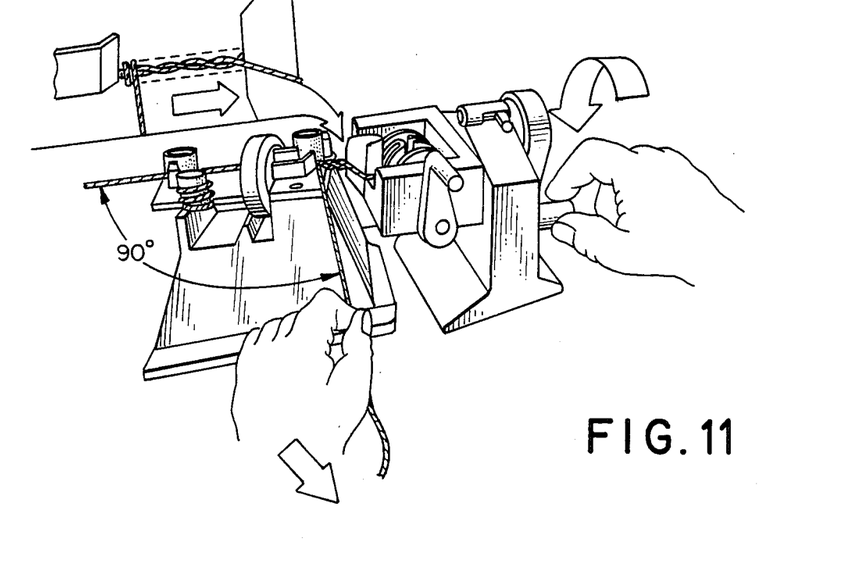

Refer now to FIG. 11. Turn the end crank 40 clockwise with your right hand. Continue cranking while pulling the tag end lightly toward you and slightly to the right. The line will roll up and over the twist, to begin a barrel wrap back to your right (see inset). Once the initial rollover is accomplished, the line should be fed at about 90° to the knot to assure tight, uniform wrapping. Keep turning the end crank with your right hand while feeding line with your left hand. Work from left to right, and completely wrap the twist, with each successive wrap up tight against the last.

Figure 12:
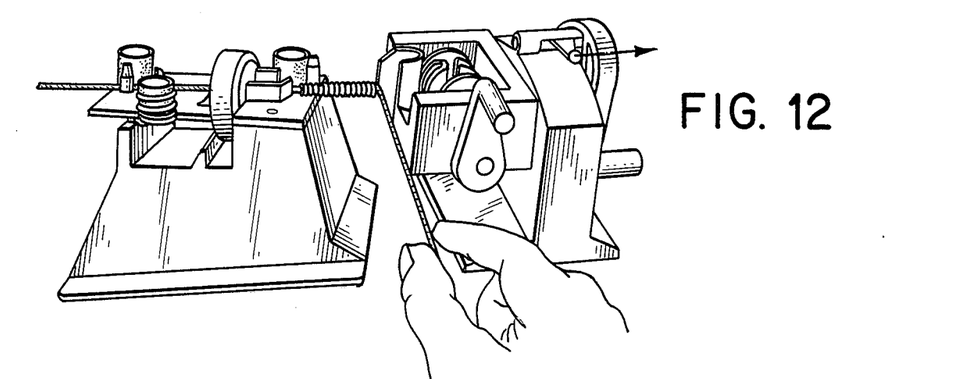

Refer now to FIG. 12. Completely cover the haywire twist with barrel wraps until you reach the front of the blade 115 on the spool frame. Stop the end crank in the down position. Lock it in place once again with the locking pin. Keep tension on the tag end and switch hands so you are now holding the tag end with your right hand.

Figure 13:
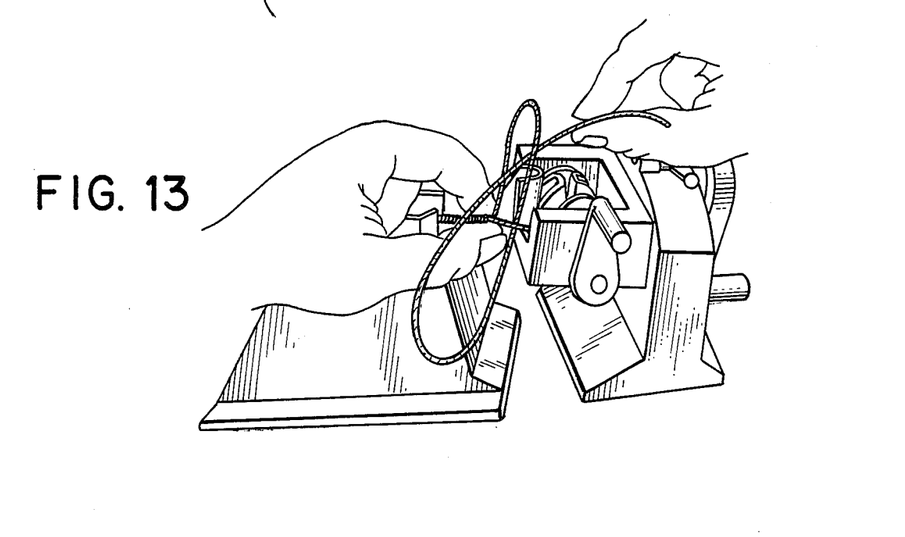

Refer now to FIG. 13. Using your left thumb and forefinger, pinch the barrel wrap to keep it from unraveling. Using your right hand, make a half hitch in the nearest leg of line by sticking the tag end down through the opening alongside the spool frame blade, bringing it up around the line leg, sticking it through its own loop, and pulling it tight.

You can now let go. The half hitch keeps the knot from unraveling. You are now ready to finish the knot.

Figure 14:
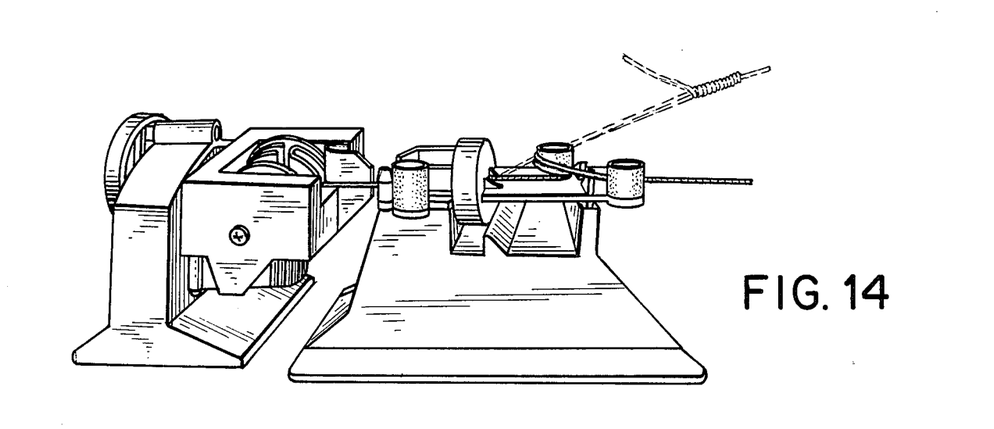

Refer now to FIG. 14. Some fishermen prefer a half hitch on each leg and finish with a half hitch over both. Some prefer three half hitches over both legs. Obviously, you may use the one you prefer but for our instruction we will use the most common method.

Figure 15:
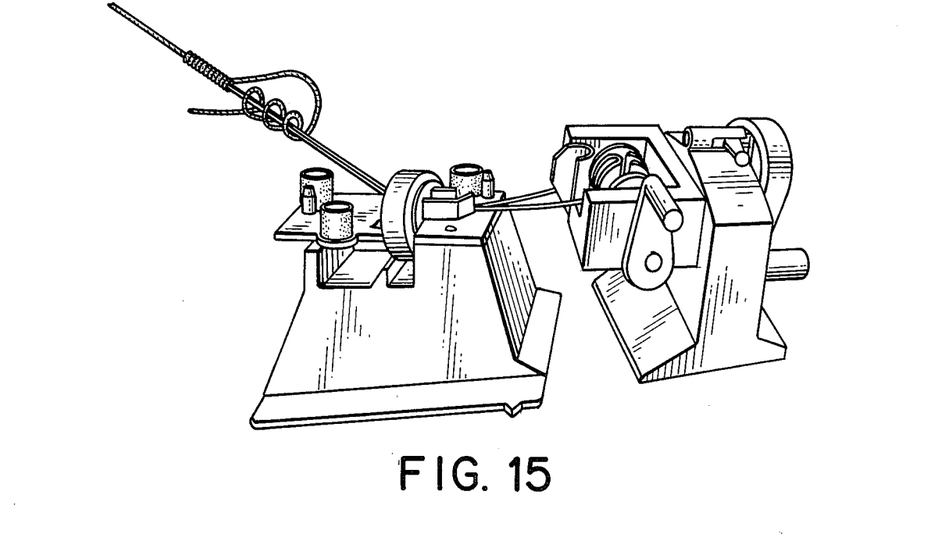

Release the line from the standing clamp 148 and unwrap it from the capstan 160. Pull out on the spool release lever 122 at the back of the spool frame. Pull the knot back through the spinner hole until it is 6"–12" to the left of the capstan 160. Let go of the spool release lever 122 to keep the spool from further unwinding. Refer now to FIG. 15. Finish the knot by making a very loose half hitch around both legs of doubled line and ahead of your earlier tied half hitch. Pass the tag end through the just formed loop two more times and tighten. Trim off tag end to ¼. Pull out on the spool release lever 122 at the back and remove the remaining loop from the spool by pulling it back out through the spinner hole. Remove the twist in the line between the knot and the rod tip, being careful not to pull and kink it. This completes this part and you can once again let go.

Figure 16:
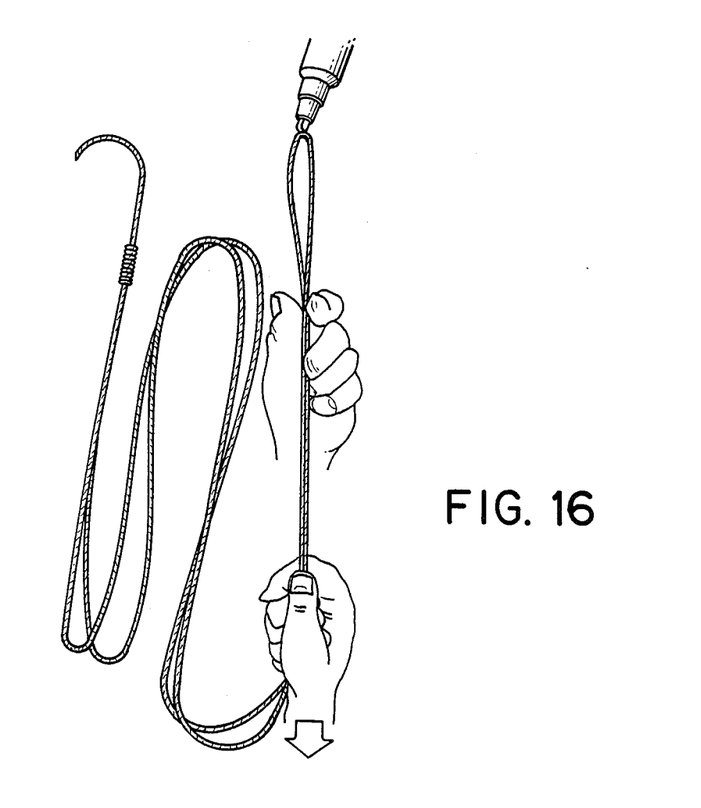

Refer now to FIG. 16. You are now ready to attach the swivel to the end of the loop opposite the bimini twist knot just tied. Use the "U" shaped bracket on the left front of the base to make an offshore swivel knot, as follows.

Initially, it is important to make sure both line legs of your loop are of equal length. Lightly grasp both line legs with your left hand just in front of the bimini twist knot. Apply even tension to both lines. Use your right hand to pull the entire loop through your left hand until you reach the end of the loop. Mark the end of the loop with a water soluble ink marker.

Figures 17, 18, 19:
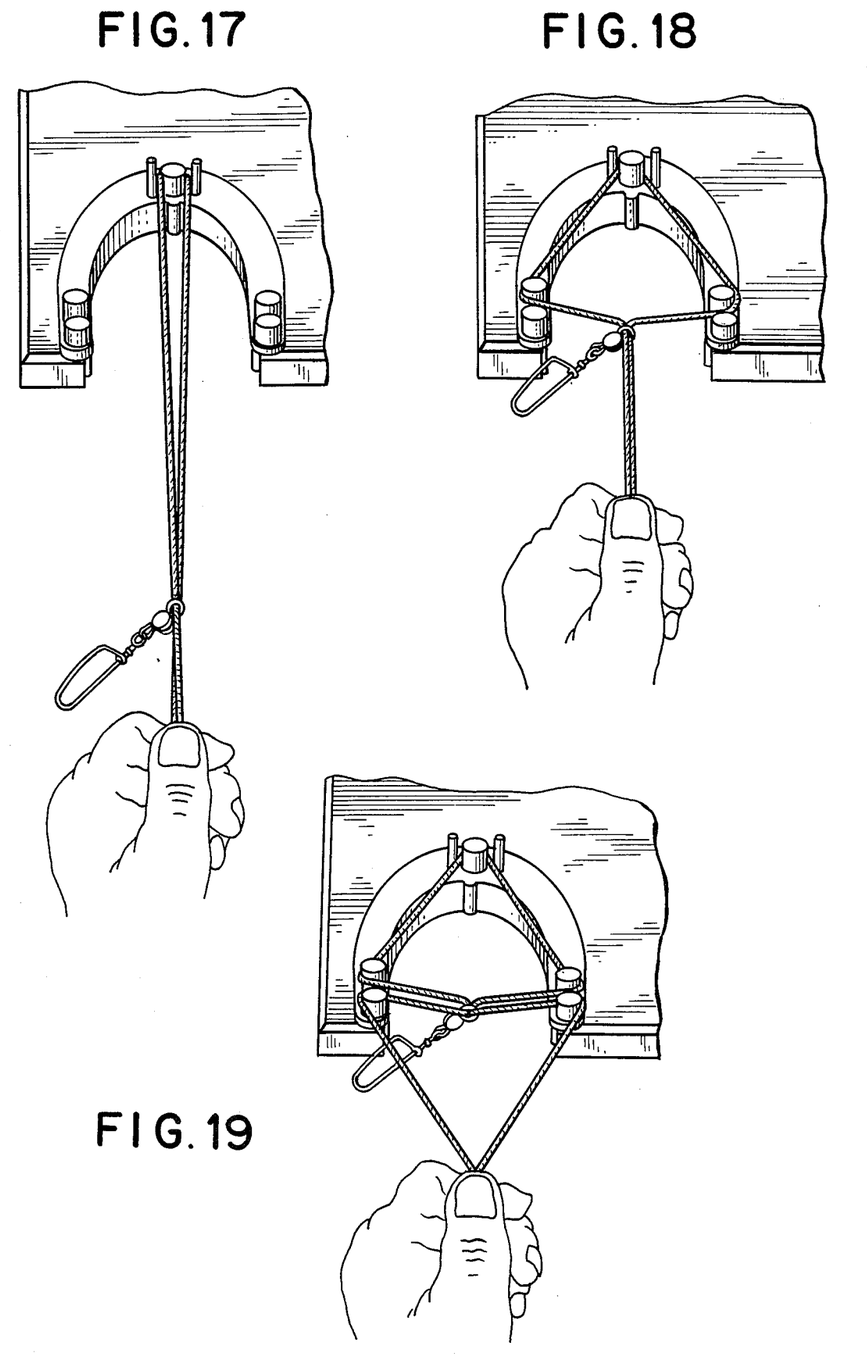

Refer now to FIGS. 17 and 18. Thread the end of the loop through the eye of your snap swivel and slide the swivel back down the lines about a foot. Hook the end of the loop over the short center post 202 on the "U" frame, carefully centering your ink mark with the post. Hold tension on both lines with the swivel in front. Hook the left line around the tall left post 214. Hook the right line around the tall right post 216.

Figure 20:
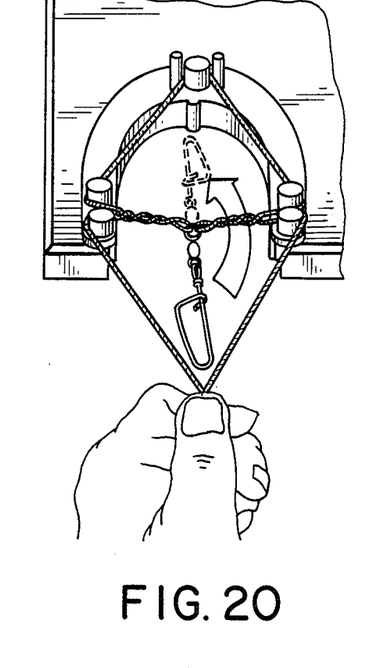

Refer now to FIGS. 19 and 20. Slide the swivel forward until it is centered in the "U". Hook the left line around the short left post 208. Hook the right line around the short right post 210. The snap swivel should now be suspended in the center of the "U".

Check to make sure the ink mark is still centered on the center post. Hold both line legs tightly with one hand. Flip the swivel over five or six times with the other hand. This will twist the line between the swivel and the side posts. Use one hand to pull up on the line and the other hand to pull up on the swivel to remove it from the "U".

Figure 21:
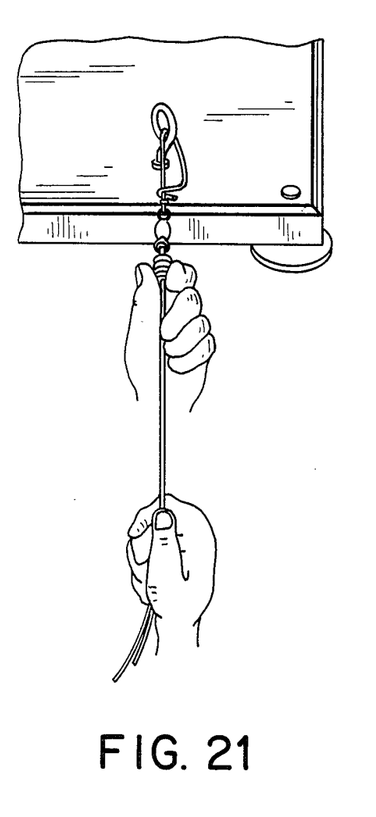

Refer now to FIG. 21. Slip the swivel snap over the stainless steel hook 220 in the base. Pull both legs of the line with one hand while using the other hand to mild the knot wraps down tight. In order to pull the knot uniformly tight, many fishermen first lubricate the loose knot with saliva. Make sure the loose line twist is removed and both line legs are even before winding your line back onto your reel. You now have an offshore swivel knot to go with your bimini twist. Do not apply any type of flame or heat to any part of either knot. It will reduce the strength. Happy fishing.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A fixture for facilitating the tying of a given knot in a fishing line, said fixture comprising: a platform member providing a flat surface for mounting of a plurality of assemblies, said plurality of assemblies comprising a spool assembly including spool means for respectively taking up or letting out line, spool crank means for rotating said spool means in at least one direction, spool frame means for mounting said spool means for rotation about a first axis of rotation defined by the spool means, and spool frame base means for mounting said spool frame means to said platform; a spinner assembly comprising spinner base means mounted to said platform and spinner means bidirectionally freely rotatably mounted to said spinner base means for rotation about a second axis of rotation; said spool base means and said spinner base means being mounted in side-by-side relationship and spaced apart on said platform in such a manner as to align the first and second axes of rotation substantially at right angles to each other and wherein said spool assembly and said spinner assembly are mounted to said platform and arranged thereupon in such a manner as to facilitate the tying of said given knot in a fishing line.

2. A fixture according to claim 1 and further including end crank means coupled with said spool frame means for bidirectionally rotating the same about an axis substantially perpendicular to the axis of rotation of said spool means, said end crank means being rotatably journaled relative to said spool frame base, such that said spool means is rotatable about a pair of mutually orthogonal axes, said axis defined by said end crank being substantially coaxially aligned with said axis of rotation of said spinner means.

3. A fixture according to claim 1 and further including a U-frame assembly comprising U-frame means mounted to said platform and a plurality of post means projecting from said U-frame means in a predetermined arrangement for facilitating the tying of a second knot in said fishing line.

4. A fixture according to claim 1 wherein said spinner means comprises a generally cylindrical bearing member having a through central opening.

5. A fixture according to claim 4 wherein said spinner assembly further comprises a plurality of projecting post means for securing a line, including at least one post means mounted for rotation in unison with said spinner means.

6. A fixture according to claim 1 wherein said spool assembly further includes ratchet means on said spool means and ratchet engaging means coupled with said spool frame and releasably engageable with said ratchet means for controlling the direction of rotation of said spool means.

7. A fixture according to claim 2 and further including locking pin means mounted to said spool frame base and releasably engageable with said end crank means for holding the same against rotation with the spool frame means in a predetermined orientation.

8. A fixture according to claim 1 wherein said spool means includes upstanding ridge means defining a slot for engaging a bent-over line portion to form a looped line and a pair of parallel and axially spaced annular channels for separately reeling and unreeling the line of said looped line to either side of said bent-over line portion to thereby form a double line.

9. A fixture according to claim 8 and further including ratchet means on said spool means and ratchet engaging means coupled with said spool frame means and releasably engageable with said ratchet means for controlling the direction of rotation of said spool means for alternately reeling and unreeling said looped line.

10. A fixture according to claim 5 wherein said projecting post means define at least one clamping means rotatable in unison with said spinner means and a second clamping means fixed against rotation relative to said spinner means, the respective clamp means being located to opposite respective sides of said bearing member through opening, and capstan means also rotatable in unison with said spinner means for receiving portion of the line wound thereabout.

11. A fixture according to claim 8 wherein said spool frame means includes guide means aligned with said channels on said spool means for holding the line portions defined by said bent-over line apart by a predetermined amount corresponding generally to the axial spacing between the channels, to facilitate the formation of said loop therein, such that the amount of line wound up on said spool channels defines the length of said loop and a corresponding length of double line.

12. A fixture according to claim 1 and further including means for slidably moving said spinner frame relative to said base generally along the axis of rotation said spinner means for correspondingly increasing and decreasing the spacing between said spinner means and said spool means.

13. Apparatus for facilitating the tying of a given knot in a fishing line, said apparatus comprising: a spool assembly and a spinner assembly adapted to be mounted to a platform member providing a flat mounting surface for said assemblies, said spool assembly including spool means for respectively taking up or letting out line, spool crank means for rotating said spool means in at least one direction, spool frame means for mounting said spool means for rotation about a first axis of rotation defined by the spool means and for mounting said spool frame means to a platform member or the like; a spinner assembly comprising spinner base means and spinner means bidirectionally freely rotatably mounted to said spinner base means for rotation about a second axis of rotation; said spool assembly and said spinner assembly being mountable in side-by-side relationship and spaced apart on a platform member, or the like in such a manner as to align the first and second axes of rotation substantially at right angles to each other and wherein said spool assembly and said spinner assembly are mountable to said platform and arranged thereupon in such a manner as to facilitate the tying of said given knot in a fishing line.

14. Apparatus according to claim 13 and further including end crank means coupled with said spool frame means for bidirectionally rotating the same about an axis substantially perpendicular to the axis of rotation of said spool means, said end crank means being rotatably journaled relative to said spool frame, such that said spool means is rotatable about a pair of mutually orthogonal axes, said axis defined by said end crank being substantially coaxially aligned with said axis of rotation of said spinner means.

15. Apparatus according to claim 13 and further including a U-frame assembly comprising U-frame means adapted to be mounted to said platform and a plurality of post means projecting from said U-frame means in a predetermined arrangement for facilitating the tying of a second knot in said fishing line.

16. Apparatus according to claim 13 wherein said spinner means comprises a generally cylindrical bearing member having a through central opening.

17. Apparatus according to claim 16 wherein said spinner assembly further comprises a plurality of projecting post means for securing a line, including at least one post means mounted for rotation in unison with said spinner means.

18. Apparatus according to claim 13 wherein said spool assembly further includes ratchet means on said spool means and ratchet engaging means coupled with said spool frame and releasably engageable with said ratchet means for controlling the direction of rotation of said spool means.

19. Apparatus according to claim 14 and further including locking pin means mounted to said spool frame and releasably engageable with said end crank means for holding the same against rotation with the spool frame means in a predetermined orientation.

20. Apparatus according to claim 13 wherein said spool means includes upstanding ridge means defining a slot for engaging a bent-over line portion to form a looped line and a pair of parallel and axially spaced annular channels for separately reeling and unreeling the lie of said looped line to either side of said bent-over line portion to thereby form a double line.

21. Apparatus according to claim 20 and further including ratchet means on said spool means and ratchet engaging means coupled with said spool frame means and releasably engageable with said ratchet means for controlling the direction of rotation of said spool means for alternately reeling and unreeling said looped line.

22. Apparatus according to claim 17 wherein said projecting post means define at least one clamping means rotatable in unison with said spinner means and a second clamping means fixed against rotation relative to said spinner means, the respective clamp means being located to opposite respective sides of said bearing member through opening, and capstan means also rotatable in unison with said spinner means for receiving a portion of the line wound thereabout.

23. Apparatus according to claim 20 wherein said spool frame means includes guide means aligned with said channels on said spool means for holding the line portions defined by said bent-over line apart by a predetermined amount corresponding generally to the axial spacing between the channels, to facilitate the formation of said loop therein, such that the amount of line wound up on said spool channels defines the length of said loop and a corresponding length of double line.

24. Apparatus according to claim 13 and further including means for slidably moving said spinner frame relative to said base generally along the axis of rotation said spinner means for correspondingly increasing and decreasing the spacing between said spinner means and said spool means.

* * * * *